United States Patent
Suzuki et al.

(10) Patent No.: US 9,587,153 B2
(45) Date of Patent: Mar. 7, 2017

(54) HEAT STORAGE MATERIAL COMPOSITION AND HEAT STORAGE MATERIAL

(71) Applicant: KITAGAWA INDUSTRIES CO., LTD., Aichi (JP)

(72) Inventors: Tomoyuki Suzuki, Inazawa (JP); Yasuo Kondo, Inazawa (JP); Makoto Kato, Inazawa (JP); Ryosuke Shiono, Inazawa (JP); Teruaki Yuoka, Inazawa (JP)

(73) Assignee: KITAGAWA INDUSTRIES CO., LTD., Aichi (JP)

(*) Notice: Subject to any disclaimer, the term of this patent is extended or adjusted under 35 U.S.C. 154(b) by 0 days.

(21) Appl. No.: 14/435,600

(22) PCT Filed: Oct. 23, 2013

(86) PCT No.: PCT/JP2013/078671
§ 371 (c)(1),
(2) Date: Apr. 14, 2015

(87) PCT Pub. No.: WO2014/069297
PCT Pub. Date: May 8, 2014

(65) Prior Publication Data
US 2015/0299548 A1    Oct. 22, 2015

(30) Foreign Application Priority Data
Oct. 31, 2012 (JP) ................. 2012-240020

(51) Int. Cl.
C09K 5/06 (2006.01)
(52) U.S. Cl.
CPC .................. C09K 5/063 (2013.01)

(58) Field of Classification Search
None
See application file for complete search history.

(56) References Cited

U.S. PATENT DOCUMENTS

| | | | |
|---|---|---|---|
| 5,718,835 A | 2/1998 | Momose et al. | |
| 8,262,925 B2 * | 9/2012 | Fieback | C09K 5/063 252/70 |

(Continued)

FOREIGN PATENT DOCUMENTS

| | | |
|---|---|---|
| CN | 1522290 | 8/2004 |
| CN | 102046715 | 5/2011 |

(Continued)

OTHER PUBLICATIONS

International Search Report issued Jan. 21, 2014 in International (PCT) Application No. PCT/JP2013/078671 along with the Written Opinion.

*Primary Examiner* — Necholus Ogden, Jr.
(74) *Attorney, Agent, or Firm* — Wenderoth, Lind & Ponack, L.L.P.

(57) ABSTRACT

A heat storage material composition contains a styrene-ethylene-ethylene-propylene-styrene copolymer and a paraffin-based wax. The heat storage material composition preferably further contains a paraffin-based process oil that softens the styrene-ethylene-ethylene-propylene-styrene copolymer. Also, the heat storage material composition preferably contains not less than 300 parts by mass and not more than 1000 parts by mass of the wax with respect to 100 parts by mass of the styrene-ethylene-ethylene-propylene-styrene copolymer.

2 Claims, 3 Drawing Sheets

(56) References Cited

U.S. PATENT DOCUMENTS

| | | | |
|---|---|---|---|
| 8,828,530 B2* | 9/2014 | Schutz | B29C 47/0021 |
| | | | 264/211.12 |
| 2004/0195678 A1 | 10/2004 | Yamazaki et al. | |
| 2007/0135576 A1* | 6/2007 | Ono | C08L 23/10 |
| | | | 525/192 |
| 2011/0193008 A1* | 8/2011 | Fieback | C09K 5/063 |
| | | | 252/67 |
| 2012/0064327 A1 | 3/2012 | Schütz et al. | |

FOREIGN PATENT DOCUMENTS

| | | |
|---|---|---|
| JP | 3-66788 | 3/1991 |
| JP | 11-228944 | 8/1999 |
| JP | 2002-105442 | 4/2002 |
| JP | 2002-114973 | 4/2002 |
| JP | 2005-187567 | 7/2005 |
| JP | 2006-193626 | 7/2006 |
| WO | 2011/098225 | 8/2011 |

* cited by examiner

HEAT STORAGE MATERIAL COMPOSITION AND HEAT STORAGE MATERIAL

TECHNICAL FIELD

The present invention relates to a heat storage material composition and a heat storage material.

BACKGROUND ART

Heat storage materials are used in various fields such as air conditioning equipment and electronic components. As such heat storage materials, heat storage materials that utilize latent heat caused by phase change of substances have been attracting attention.

As the heat storage materials that utilize latent heat caused by phase change (also referred to as "latent heat-type heat storage materials"), for example, a latent heat-type heat storage material containing paraffins such as wax as disclosed in Patent Literature 1 has been known.

Such a latent heat-type heat storage material stores heat during phase change from a solid to a liquid, and dissipates heat during phase change from a liquid to a solid. Therefore, wax or the like may flow and leak out during phase change from a solid to a liquid.

As a method for preventing wax or the like from leaking out, there are adapted a method of housing in a bag or a closed container, a method of storing in porous substances, a method of microencapsulating wax or the like used as a heat storage material, and the like (see Patent Literature 1).

CITATION LIST

Patent Literature

PATENT LITERATURE 1: JP-A-3-66788

SUMMARY OF INVENTION

Problems to be Solved by the Invention

However, the method of housing in a bag or a closed container requires a container having sufficient strength. Therefore, the cost is increased in some cases. Also, in some of the containers used, there is a possibility that the housed wax or the like leaks out. Further, in the method of storing in porous substances and in the method of microencapsulation, the manufacturing processes are complicated, thereby increasing the cost. Furthermore, in some cases, the amount of wax or the like to be housed is limited and thus the sufficient performance is not obtained. Also, wax or the like leaks out from the porous substances or the microcapsule in some cases.

The present invention has been accomplished in view of the above-described circumstances. An object of the present invention is to provide a heat storage material composition and a heat storage material in which exudation (bleed-out) of a material such as wax is inhibited.

Solutions to the Problems

As the result of intensive research to solve the above-described problems, it was found out that, in a heat storage material prepared with a heat storage material composition containing a styrene-ethylene-ethylene-propylene-styrene copolymer, bleed-out can be significantly inhibited compared to a conventional heat storage material. The present invention is based on such novel knowledge.

That is, the present invention is a heat storage material composition containing a styrene-ethylene-ethylene-propylene-styrene copolymer and a paraffin-based wax.

Also, the present invention is a heat storage material obtained by molding the heat storage material composition.

In the present invention, the heat storage material composition contains the styrene-ethylene-ethylene-propylene-styrene copolymer. Accordingly, the heat storage material prepared by using the heat storage material composition can be inhibited from bleeding out.

The present invention preferably has the following configurations. The heat storage material composition may be configured to further contain a paraffin-based process oil that softens the styrene-ethylene-ethylene-propylene-styrene copolymer. Such a configuration is preferred because the flexibility can be imparted to the heat storage material and the applications of the heat storage material can be widened.

Not less than 300 parts by mass and not more than 1000 parts by mass of the paraffin-based wax may be contained with respect to 100 parts by mass of the styrene-ethylene-ethylene-propylene-styrene copolymer.

A higher amount of wax increases heat storage properties. However, wax or the like becomes likely to bleed out when, for example, left in a high temperature state for an extended period. The above-described configuration is excellent in the effect of inhibiting bleed-out even in a high temperature state for an extended period, and is therefore preferred.

Not less than 100 parts by mass and not more than 250 parts by mass of the paraffin-based process oil may be contained with respect to 100 parts by mass of the styrene-ethylene-ethylene-propylene-styrene copolymer.

A large amount of the paraffin-based process oil causes the process oil or the like to become likely to bleed out when, for example, left in a high temperature state for an extended period. The above-described configuration provides appropriate flexibility and can inhibit bleed-out, and is therefore preferred.

Effects of the Invention

According to the present invention, there can be provided a heat storage material composition and a heat storage material in which bleed-out is inhibited.

DESCRIPTION OF EMBODIMENTS

Figure 1:
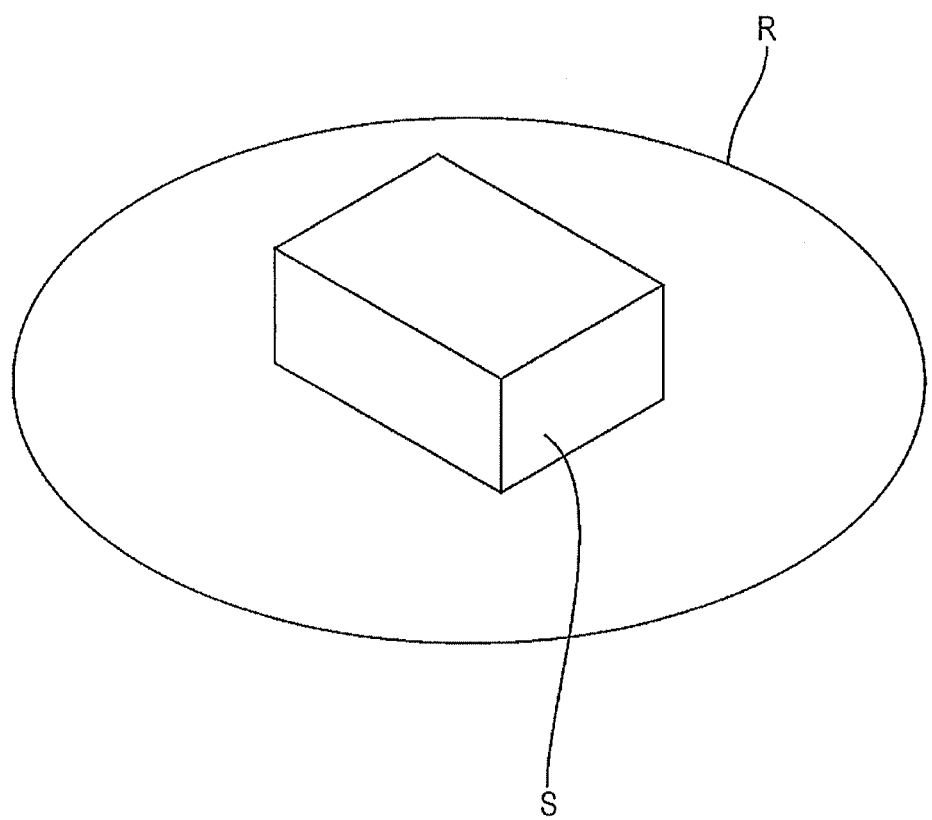
FIG. 1 is a diagram for describing a test method.

A heat storage material composition according to the present invention contains a styrene-ethylene-ethylene-propylene-styrene copolymer and a paraffin-based wax.

The styrene-ethylene-ethylene-propylene-styrene copolymer (hereinafter, also referred to as a "SEEPS copolymer") is a thermoplastic polymer. The weight average molecular weight of this SEEPS copolymer is preferably 200,000 to 400,000. Also, the styrene content in the SEEPS copolymer is preferably 25% by mass to 35% by mass.

Examples of the SEEPS copolymer to be used include a polymer obtained by polymerizing monomers (styrene, ethylene, and propylene) constituting the copolymer, and a commercially-available product. Examples of the commercially-available product include SEPTON® 4033, SEPTON® 4055, SEPTON® 4077, and SEPTON® 4099 manufactured by Kuraray Co., Ltd. A preferred example of the SEEPS copolymer is SEPTON® 4055 manufactured by Kuraray Co., Ltd., since the shape of the heat storage material can be maintained even when the formulation amount of the wax is large.

The wax to be used contains saturated hydrocarbon as a main component, and is in a solid state or a semi-solid state at normal temperature. The wax to be used has a melting point (phase transition temperature) of, for example, 30 to 170° C. The wax can be selected according to the application and the location where the wax is used.

Examples of the wax include a paraffin-based wax having 20 to 80 carbon atoms and containing two or more normal paraffins, and a microcrystalline wax having 20 to 70 carbon atoms and containing many isoparaffins or cycloparaffins. Specific examples of the wax include SP-0145, FNP-0090, FT-0115, HNP-10, ParaffinWax-115, and HiMic®-2045, manufactured by Nippon Seiro Co., Ltd. As the wax, the paraffin-based wax is preferred.

The heat storage material composition according to the present invention may contain a paraffin-based process oil (hereinafter, also referred to as a "process oil") that acts as a softening agent for softening the SEEPS copolymer. The heat storage material obtained by using the heat storage material composition containing the process oil has flexibility. This heat storage material can be suitably used not only as a heat storage material but also as a buffer material.

The molecular weight of the process oil is preferably 400 to 800. Specific examples of the process oil include PW series (PW-32, PW-90 and PW-380) manufactured by Idemitsu Kosan Co., Ltd.

The heat storage material composition preferably contains not less than 300 parts by mass and not more than 1000 parts by mass of the paraffin-based wax with respect to 100 parts by mass of the SEEPS copolymer. A higher amount of the wax increases heat storage properties. However, the wax becomes likely to bleed out when, for example, left in a high temperature state for an extended period. A configuration having a wax content within the above-described range is excellent in the effect of inhibiting bleed-out even when left in a high temperature state for an extended period, and is therefore preferred.

The heat storage material composition usually contains not less than 0 parts by mass and not more than 500 parts by mass of the process oil with respect to 100 parts by mass of the SEEPS copolymer. A large amount of the process oil causes the process oil or the like to become likely to bleed out when, for example, left in a high temperature state for an extended period. When not less than 100 parts by mass and not more than 250 parts by mass of the process oil is contained with respect to 100 parts by mass of the SEEPS copolymer, appropriate flexibility can be provided, and bleed-out can be inhibited. Accordingly, such a content of the process oil is preferred.

The heat storage material composition according to the present invention is obtained by mixing the SEEPS copolymer, the paraffin-based wax and, as necessary, the process oil.

Examples of the method for mixing the SEEPS copolymer with the wax and the like include a method of placing components in a kneader and thereafter kneading the components for a prescribed time in a state of being heated at 180 to 200° C. When the process oil is formulated in the heat storage material composition, the process oil is placed together with the SEEPS copolymer and the wax in the kneader to be kneaded. The temperature and time for kneading can be appropriately adjusted depending on the formulation ratio of each component, the type of the wax, and the like.

Next, an example of the method for preparing the heat storage material by using the heat storage material composition according to the present invention will be described. The heat storage material composition is poured into a molding die, and pressed by a press (pressing step). When pressing the heat storage material composition, heating the heat storage material composition poured in the die to the temperature at which softening is caused allows the heat storage material to be easily processed into a desired shape. After the pressing step, the heat storage material composition is cooled down to room temperature in a state of being placed in the die. Thereafter, the heat storage material composition is removed from the die to obtain a heat storage material.

The heat storage material prepared by using the heat storage material composition according to the present invention is useful in the application of absorbing heat generated in electronic components to control temperature variations, the application of conditioning air in automobiles, and the like.

Examples

The present invention will be further described specifically by examples below.
(1) Preparation of Heat Storage Materials
(Preparation of Example A1)

In a kneader [Labo Plastomill manufactured by Toyo Seiki Seisaku-sho, Ltd], 100 parts by mass of SEPTON® 4055 (weight average molecular weight 200,000 to 300,000) manufactured by Kuraray Co., Ltd. as the SEEPS copolymer, 100 parts by mass of a paraffin wax SP-0145 (molecular weight 500, melting point 63° C.) manufactured by Nippon Seiro Co., Ltd. as the wax, 300 parts by mass of a paraffin-based process oil PW380 (molecular weight approximately 760) manufactured by Idemitsu Kosan Co., Ltd. as the process oil were placed. These placed raw materials were kneaded for five minutes while being heated to 180° C., to obtain Composition A1.

Composition A was poured into a sheet-shaped die (molding size 120 mm×120 mm×2 mm). Using a hot press [IMC-180C manufactured by Imoto Machinery Co., Ltd.], the materials were molded under pressure at a pressure of 20 MPa while being heated so that the die temperature became 150° C. After the molding under pressure, the die was left to cool down. A 20 mm×20 mm×2 mm sheet-like sample as Example A1 was cut out from the sheet-like molded product taken out from the die.
(Preparation of Example B1, and Comparative Examples C1 and D1)

Example B1, Comparative Examples C1 and D1 were prepared in the same manner as Example A1, except that the amount of the wax and the amount of the process oil were changed as described in Table 1.
(Preparation of Comparative Example a1)

Comparative Example a1 was prepared in the same manner as Example A1, except that 100 parts by mass of KRATON® G1651H [a styrene-ethylene-butylene-styrene copolymer (SEBS copolymer) having a weight average molecular weight of 200,000 to 300,000] manufactured by Kraton Performance Polymers, Inc. was used in place of 100 parts by mass of the SEEPS copolymer.

(Preparation of Comparative Examples b1, c1 and d1)

Comparative Example b1, Comparative Example c1 and Comparative Example d1 were prepared in the same manner as Comparative Example a1, except that the amount of the paraffin wax and the amount of the paraffin-based process oil were changed as described in Table 1.

TABLE 1

| Sample | Polymer | Process oil | Wax |
|---|---|---|---|
| Example A1 | SEEPS copolymer 100 | 100 | 300 |
| Comparative Example a1 | SEBS copolymer 100 | | |
| Example B1 | SEEPS copolymer 100 | 250 | 750 |
| Comparative Example b1 | SEBS copolymer 100 | | |
| Example C1 | SEEPS copolymer 100 | 500 | 1500 |
| Comparative Example c1 | SEBS copolymer 100 | | |
| Comparative Example D1 | SEEPS copolymer 100 | 0 | 1000 |
| Comparative Example d1 | SEBS copolymer 100 | | |

(2) Evaluation Test 1

Examples A1 and B1, Comparative Examples C1, D1, a1, b1, c1 and d1 were subjected to an evaluation test for bleed-out inhibiting effect by the following method.

In this evaluation test, each sample was prepared for each heating condition (described later in detail). For example, Example B1 was used in the evaluation test for 14 conditions of 1 hour, 2 hours, 4 hours, 14 hours and 24 hours at a heating temperature of 80° C., 0.5 hours, 1 hour, 2 hours, 4 hours, 14 hours and 24 hours at a heating temperature of 100° C., and 1 hour, 2 hours and 4 hours at a heating temperature of 120° C. Therefore, 14 samples were prepared. Comparative Example b1 was used in the evaluation test for the same heating conditions as those for Example B1. Therefore, 14 samples were prepared. Eleven samples were prepared for Example A1 and Comparative Example a1; 10 samples were prepared for Comparative Example C1 and Comparative Example c1; and one sample was prepared for Comparative Example D1 and Comparative Example d1.

Prior to the evaluation test, a mass of each sample was measured in advance. The measured value was defined as a sample initial mass.

As illustrated in FIG. 1, each sample placed on the center of a filter paper sheet (JIS P3801 5 type A, No. 5A diameter 125 mm, manufactured by Toyo Roshi Kaisha, Ltd.) was heated in a heating chamber set at a prescribed temperature (80° C., 100° C. or 120° C.) for a prescribed time (see Table 2). Thereafter, the sample was separated from the filter paper sheet. The mass of the sample was measured (a sample mass after heating). In FIG. 1, R indicates a filter paper sheet, and S indicates a sample.

Using the measured value of the sample initial mass and the measured value of the sample mass after heating, a loss in mass (%) was calculated according to Formula (1) below. The loss in mass (%) is described in Table 2.

Loss in mass (%)=100×(Sample initial mass−Sample mass after heating)/Sample initial mass (1)

It is indicated that, as the numerical value of the loss in mass is larger, the bleed-out amount is larger. It was determined in this evaluation test that, when the loss in mass was not more than 1%, there was no bleed-out.

Figure 2:
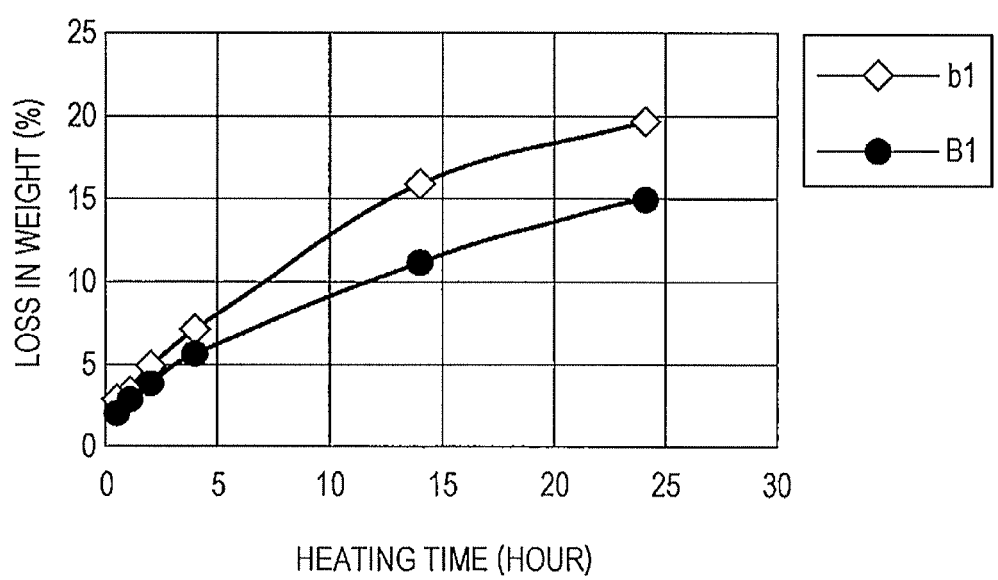
FIG. 2 is a graph indicating a relationship between a heating time and a loss in mass when Sample B1 and Sample b1 were heated at 100° C.
Figure 3:
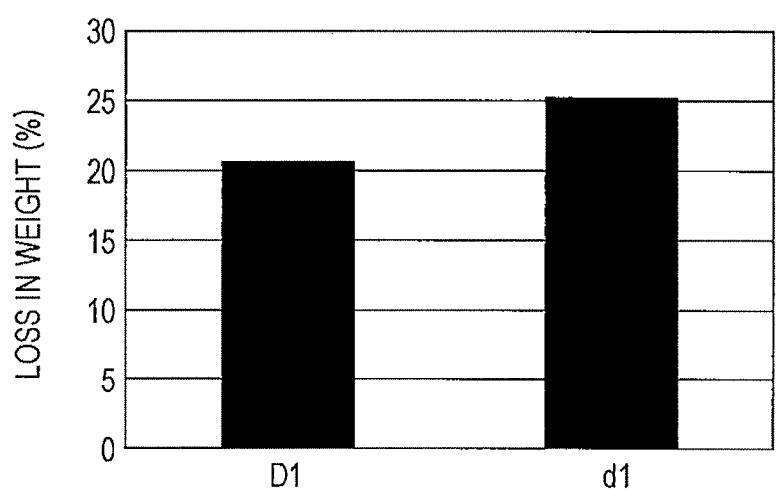
FIG. 3 is a graph comparing a loss in mass between Sample D1 and Sample d1.

Furthermore, FIG. 2 is a graph comparing the loss in mass between Example B1 and Comparative Example b1 when Example B1 and Comparative Example b1 were heated at 100° C. for prescribed times (0.5 hours, 1 hour, 2 hours, 4 hours, 14 hours and 24 hours). Also, FIG. 3 is a graph comparing the loss in mass between Comparative Example D1 and Comparative Example d1 after Comparative Example D1 and Comparative Example d1 were heated at 100° C. for 24 hours.

TABLE 2

| Sample | Heating temperature | Loss in mass (%) for each heating time | | | | | |
|---|---|---|---|---|---|---|---|
| | | 0.5 h | 1 h | 2 h | 4 h | 14 h | 24 h |
| Example A1 | 80° C. | — | 0.22 | 0.28 | 0.36 | 0.74 | 0.86 |
| | 100° C. | — | 0.31 | 0.51 | 0.56 | 0.75 | 0.95 |
| | 120° C. | — | — | 0.38 | — | | |
| Example B1 | 80° C. | — | 2.51 | 3.53 | 5.20 | 9.10 | 12.7 |
| | 100° C. | 2.1 | 2.9 | 3.9 | 5.6 | 11.1 | 15.1 |
| | 120° C. | — | 3.29 | 4.75 | 6.6 | — | — |
| Comparative Example C1 | 80° C. | — | 6.50 | 9.90 | 13.9 | 30.6 | 35.4 |
| | 100° C. | 5.3 | 7.64 | 10.0 | 15.0 | 34.6 | — |
| Comparative Example D1 | 100° C. | — | — | — | — | — | 20.5 |
| Comparative Example a1 | 80° C. | — | 0.48 | 0.64 | 0.74 | 1.07 | 1.23 |
| | 100° C. | — | 0.62 | 0.75 | 0.81 | 1.06 | 1.21 |
| | 120° C. | — | — | — | 0.71 | — | — |
| Comparative Example b1 | 80° C. | — | 3.14 | 4.76 | 8.09 | 12.5 | 16.7 |
| | 100° C. | 2.9 | 3.3 | 4.9 | 7.1 | 15.9 | 19.6 |
| | 120° C. | — | 4.09 | 5.66 | 8.66 | — | — |
| Comparative Example c1 | 80° C. | — | 6.60 | 10.8 | 15.9 | 33.0 | 41.7 |
| | 100° C. | 5.9 | 8.26 | 11.1 | 16.6 | 34.7 | — |
| Comparative Example d1 | 100° C. | — | — | — | — | — | 25.1 |

(3) Results and Considerations

As illustrated in Table 2, FIGS. 2 and 3, when comparing between the samples that have the same composition other than the polymer and that were heated in the same heating condition (temperature and time) (for example, Example B1 heated at 100° C. for 24 hours and Comparative Example b1 heated at 100° C. for 24 hours), it was found that the losses in mass of Examples A1 and B1, Comparative Examples C1 and D1 prepared by using the SEEPS copolymer were smaller than the losses in mass of Comparative Examples a1, b1, c1 and d1 (comparative heat storage materials prepared by using the heat storage material composition containing the polymer disclosed in Patent Literature 1).

From this result, it became clear that according to the present invention, the heat storage material composition and the heat storage material can inhibit bleed-out more than the known heat storage material.

Incidentally, it was found that Example A1 containing a small amount of the wax and the process oil did not bleed out.

Furthermore, it was found that the heat storage material prepared by using the composition containing not less than 300 parts by mass and not more than 1000 parts by mass of the wax with respect to 100 parts by mass of the SEEPS copolymer was especially unlikely to bleed out. From this result, it became clear that the amount of the wax was preferably not less than 300 parts by mass and not more than 1000 parts by mass with respect to 100 parts by mass of the SEEPS copolymer.

Other Embodiments

The present invention is not limited to the embodiment described above and illustrated in the drawings. For example, the following embodiments may be included in the technical scope of the present invention.
(1) In the above-described examples, SEPTON® 4055 manufactured by Kuraray Co., Ltd. was used as the SEEPS copolymer. However, other SEEPS copolymers such as SEPTON® 4033, SEPTON® 4077 and SEPTON® 4099 may be used.
(2) In the above-described examples, the paraffin wax SP-0145 manufactured by Nippon Seiro Co., Ltd. was used as the wax. However, other waxes such as FNP-0090, FT-0115, HNP-10, Wax-115 and HiMic-2045 manufactured by Nippon Seiro Co., Ltd. may be used.
(3) In the above-described examples, PW-380 manufactured by Idemitsu Kosan Co., Ltd. was used as the process oil. However, other process oils such as PW-32 and PW-90 manufactured by Idemitsu Kosan Co., Ltd. may be used.

DESCRIPTION OF REFERENCE SIGNS

R . . . filter paper sheet
S . . . sample

The invention claimed is:
1. A heat storage material composition comprising:
a styrene-ethylene-ethylene-propylene-styrene copolymer;
not less than 300 parts by mass and not more than 1000 parts by mass of a paraffin-based wax having a melting point of 30 to 170° C. with respect to 100 parts by mass of the styrene-ethylene-ethylene-propylene-styrene copolymer; and
not less than 100 parts by mass and not more than 250 parts by mass of a paraffin-based process oil having a molecular weight of 400 to 800 with respect to 100 parts by mass of the styrene-ethylene-ethylene-propylene-styrene copolymer,
wherein the paraffin-based process oil softens the styrene-ethylene-ethylene-propylene-styrene copolymer.
2. A heat storage material obtained by molding the heat storage material composition according to claim 1.

* * * * *